United States Patent
Safvi et al.

(10) Patent No.: US 11,279,563 B2
(45) Date of Patent: Mar. 22, 2022

(54) SYSTEMS AND METHODS FOR A WIRE PLATE CONVEYOR BELT

(71) Applicants: Cambridge International, Inc., Cambridge, MD (US); Prince Castle LLC, Carol Stream, IL (US)

(72) Inventors: Sajid A. Safvi, Lombard, IL (US); Robert E. Maine, Jr., Salisbury, MD (US); Thomas O. Perdue, Salisbury, MD (US)

(73) Assignees: Cambridge International, Inc., Cambridge, MD (US); Prince Castle LLC, Carol Stream, IL (US)

( * ) Notice: Subject to any disclaimer, the term of this patent is extended or adjusted under 35 U.S.C. 154(b) by 0 days.

(21) Appl. No.: 16/717,785

(22) Filed: Dec. 17, 2019

(65) Prior Publication Data
US 2021/0179359 A1    Jun. 17, 2021

(51) Int. Cl.
*B65G 17/06* (2006.01)
*B65G 17/42* (2006.01)

(52) U.S. Cl.
CPC .......... *B65G 17/067* (2013.01); *B65G 17/42* (2013.01)

(58) Field of Classification Search
CPC .. B65G 17/083; B65G 17/063; B65G 17/065; B65G 17/067; B65G 17/086; B65G 17/34; B65G 17/42
See application file for complete search history.

(56) References Cited

U.S. PATENT DOCUMENTS

| | | | |
|---|---|---|---|
| 861,484 A | 7/1907 | Stewart | |
| 2,660,292 A * | 11/1953 | Cheesman | B65G 17/08 198/853 |
| 2,767,824 A | 10/1956 | King | |
| 3,096,875 A | 7/1963 | Olson | |
| 3,706,200 A * | 12/1972 | Mueller | B65G 17/08 59/35.1 |
| 3,854,575 A | 12/1974 | Fraioli, Sr. | |
| 4,074,518 A * | 2/1978 | Taubert | B21L 11/00 59/15 |
| 4,176,528 A * | 12/1979 | Frohbieter | B65G 17/08 198/699.1 |
| 4,611,710 A * | 9/1986 | Mitsufuji | B65G 17/08 198/853 |
| 4,676,368 A * | 6/1987 | Damkjar | B65G 17/08 198/852 |
| 5,358,095 A | 10/1994 | Curl | |
| 5,497,874 A * | 3/1996 | Layne | B65G 17/08 198/377.01 |

(Continued)

FOREIGN PATENT DOCUMENTS

| | | | |
|---|---|---|---|
| EP | 0597455 A1 * | 5/1994 | ............ B65G 17/08 |
| EP | 1067065 A2 | 1/2001 | |

(Continued)

*Primary Examiner* — William R Harp
(74) *Attorney, Agent, or Firm* — Quarles & Brady LLP

(57) ABSTRACT

A plate element is disclosed that is capable of use in a wire conveyor belt assembly having multiple spaced rods. The plate element may include a plate body having a planar base surface, one or more engagement elements to engage one or more of the spaced rods, and an interface element that extends away from the planar base surface to form a raised interface surface.

19 Claims, 11 Drawing Sheets

(56) References Cited

U.S. PATENT DOCUMENTS

| | | | | |
|---|---|---|---|---|
| 5,628,393 | A * | 5/1997 | Steeber | B65G 15/62 |
| | | | | 198/699.1 |
| 6,024,637 | A * | 2/2000 | Scherch | A22C 11/001 |
| | | | | 198/850 |
| 6,142,294 | A | 11/2000 | Kobayashi et al. | |
| 7,111,725 | B2 * | 9/2006 | Marshall | B65G 17/08 |
| | | | | 198/850 |
| 7,314,132 | B2 * | 1/2008 | Layne | B65G 17/08 |
| | | | | 198/850 |
| 7,987,972 | B2 | 8/2011 | Hennigar et al. | |
| 9,162,818 | B2 * | 10/2015 | van den Berg | B65G 15/32 |
| 9,889,992 | B1 * | 2/2018 | Adomaitis | A47J 37/045 |
| 10,183,808 | B2 * | 1/2019 | Menke | B65G 17/08 |
| 2010/0275789 | A1 * | 11/2010 | Lee | A47J 37/0857 |
| | | | | 99/386 |
| 2019/0077605 | A1 | 3/2019 | Patel et al. | |

FOREIGN PATENT DOCUMENTS

| | | |
|---|---|---|
| JP | H06141985 A | 5/1994 |
| JP | 2003118820 A | 4/2003 |

\* cited by examiner

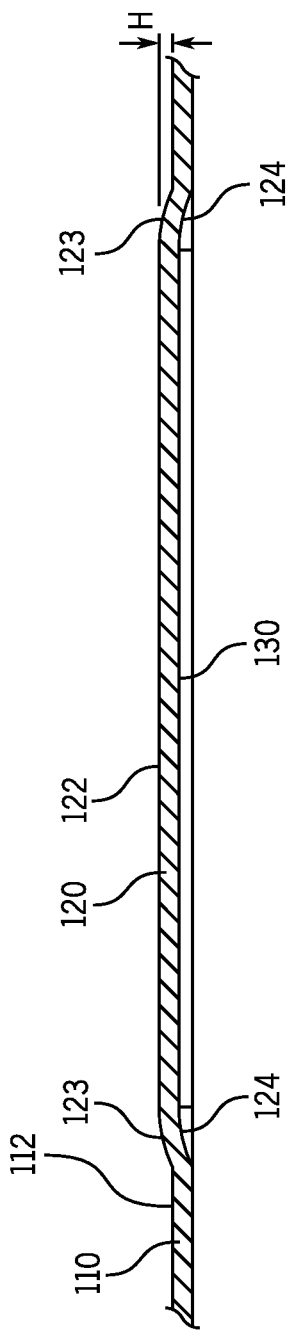
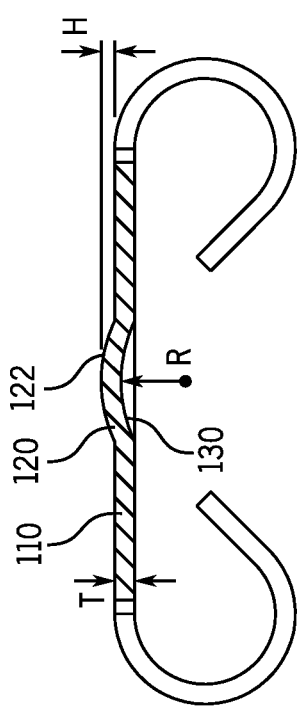
FIG. 2B
FIG. 2C

SYSTEMS AND METHODS FOR A WIRE PLATE CONVEYOR BELT

CROSS-REFERENCE TO RELATED APPLICATION

Not applicable.

STATEMENT CONCERNING FEDERALLY SPONSORED RESEARCH AND DEVELOPMENT

Not applicable.

TECHNICAL FIELD

The present disclosure is described in the context of a conveyor assembly. More specifically, the present disclosure relates to a plate element having a raised interface element for engaging a product in, for instance, a wire plate conveyor belt assembly.

BACKGROUND

Wire conveyor belts are often used for material handling, cooking, icing, slicing breading, cooling, filling, inspecting, and packing of products like breads, rolls, buns, donuts, confections, cakes, pies, pastries, light loads of meat, seafood, poultry, and processed products. In addition, wire conveyor belts are suitable for light-duty applications in metalworking and other industries.

In one specific example, wire conveyor belts are used in connection with commercial toasters. Commercial toasters typically employ metal conveyor belts to move product, such as buns, through the toaster at a controlled speed and temperature during a toasting process. The conveyor belt is used to usher the product through the toaster at a controlled rate to help ensure that the particular products are properly processed for consumption or further processing. Generally horizontal toasters may include a single belt on which the product is carried or a pair of belts that support the products against a central heating element as the products are urged along the heating element by the respective belt. Similarly, a typical vertical toaster may include a pair of opposing conveyor belts that are spaced from a central heating element. The products are received and captured between the central heating element (e.g., a heating plate) and a respective conveyor belt at an upper end, and are escorted downward by the conveyor belt as the product moves along the heating element. The conveyor belts of, for instance, a vertical toaster are to prevent the product from dropping through the toaster too quickly (hence being undercooked) and from getting caught within the toaster (hence being overcooked). As such, the interface between the belt(s) and the product can be an important consideration to ensure desired movement of the product through the toaster, whether the toaster is horizontal or vertical and incorporates one or multiple belts. If the toaster belt surface is too smooth, the friction or engagement between the product and the toaster belt may not be sufficient to properly convey the product through the toaster (e.g., against a heating plate in a heating element zone). As one result, the product may dwell (e.g., not keep pace with the movement of the underlying toaster belt(s)) inside the toaster, overheat, and be burned against a hot surface, thereby degrading the product. Conversely, if the surface of the toaster belt is too rough, the belts can cause undesirable marking and/or tearing of the products. The potential drawbacks of belt surfaces being too smooth or too rough are especially objectionable in high-volume commercial operations.

Moreover, applying a proper texture to the surface of the belt components can be difficult and costly due to the thin cross sections of those components and the handling of the same. Texturing the belt can result in overheating or distorting the product contact components, and/or may create localized rough surfaces on the parts, which can cause stress risers resulting in component fatigue failure during service. Finally, during use of the toaster, there can be a build-up of product on the belt surfaces over time that can alter the surface roughness/parameters and render the belt no longer optimal for the particular application.

Therefore, in view of at least the above, a need exists for an improved interface configuration between a belt and a product that facilitates moving the product at a desired pace and reduces instances of undesired product degradation, such as with markings and tears, while lowering manufacturing costs of the components.

SUMMARY

Some embodiments described herein provide a plate element for use in a wire conveyor belt assembly having a plurality of spaced rods. The plate element includes a plate body having a planar base surface. The plate element further includes a leading engagement element that extends from the plate body and is configured to engage a leading rod of the plurality of spaced rods, and a trailing engagement element that extends from the plate body and is configured to engage a trailing rod of the plurality of spaced rods. The plate element further includes at least one interface element that extends away from the planar base surface to form a raised interface surface.

In another embodiment, a conveyor belt assembly is provided. The assembly includes a plurality of spaced rods disposed transversely with respect to a direction of travel of the conveyor belt, and a plurality of plate elements configured to engage at least some of the plurality of spaced rods, each of the plurality of plate elements has a planar base surface. At least one of the plate elements includes an interface element extending from the planar base surface.

In another embodiment, a method of manufacturing a plate element for use in a conveyor assembly having a plurality of spaced rods is provided. The method includes forming a planar sheet of material thereby defining an outline of the plate element, forming a raised interface element on one side of the planar sheet, and coupling the plate element to at least one of the plurality of rods.

BRIEF DESCRIPTION OF THE DRAWINGS

The following detailed description is to be read with reference to the figures, in which like elements in different figures have like reference numerals. The figures, which are not necessarily to scale, depict selected embodiments and are not intended to limit the scope of embodiments of the invention. Given the benefit of this disclosure, skilled artisans will recognize the examples provided herein have many useful alternatives that fall within the scope of the invention.

FIG. 2B is a partial cross-sectional side view of the example plate element of FIG. 2A taken along line B-B.

FIG. 2C is a partial cross-sectional side view of the example plate element of FIG. 2A taken along line C-C.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Given the benefit of this disclosure, various modifications to the illustrated embodiments will be readily apparent to those skilled in the art and the underlying principles herein can be applied to other embodiments and applications without departing from the invention. Thus, embodiments of the invention are not intended to be limited to embodiments shown, but are to be accorded the widest scope consistent with the principles and features disclosed herein.

Figure 1:
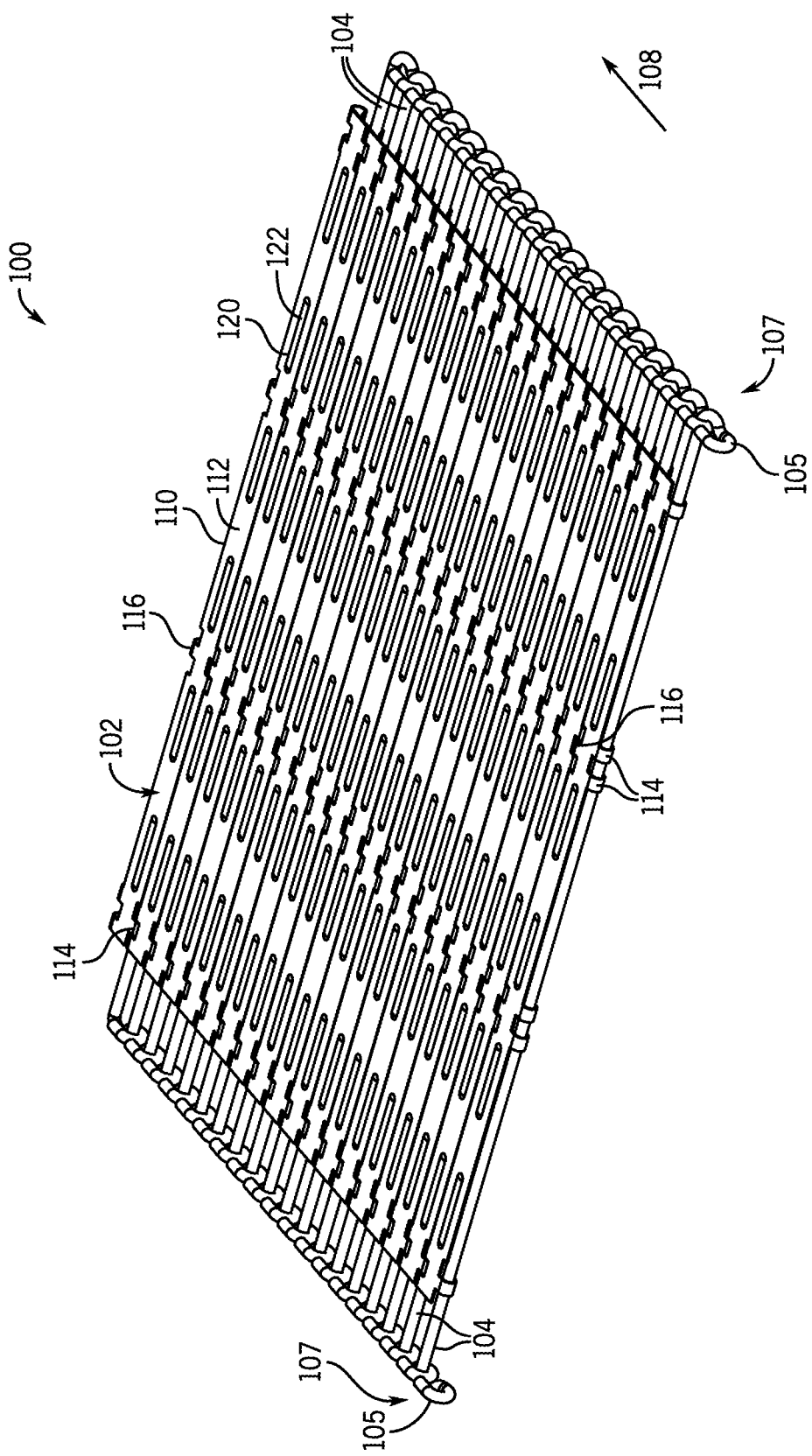
FIG. 1 is a top isometric view of a portion of an example wire conveyor belt assembly according to an embodiment of the invention.

A portion of an example wire conveyor belt assembly 100 incorporating a plurality of plate elements 102 according to one embodiment is shown in FIG. 1. In use, a wire conveyor belt is typically a continuous belt that can be driven by conventional techniques. In addition, while only a portion of a wire conveyor belt assembly 100 is shown and described, it is appreciated that the example wire conveyor belt assembly 100 (and plate elements 102) may be configured for use in a variety of applications, including a single or dual belt horizontal toaster and a single or dual belt vertical toaster. The advantages of the plate elements 102 are particularly realized when adapted for use in a vertical toaster in which the product is compressed or urged by plate elements 102 of the wire conveyor belt assembly 100 against a vertically oriented heating element. The product is engaged by the plate elements 102 to progress downward along the heating element and through the toaster at a prescribed rate that is generally equivalent to the rate at which the plate elements 102 travel.

The plurality of plate elements 102 of the wire conveyor belt assembly 100 are engaged with a plurality of transversely spaced rods 104. As shown, the rods 104 are generally arranged perpendicular to a direction of travel 108 of the wire conveyor belt assembly 100. In the example shown, the rods 104 may be formed from a metal wire, such as stainless steel (e.g., AISI T-304 or any similar metal wire), and the ends 105 of each rod 104 may be bent a predetermined distance and curled to form knuckles 107 that interlock adjacent rods 104. The example rods 104 are manufactured from 9 gauge wire having a nominal diameter of about 0.15 inches. Other form factors of rods/wires/structures can be used to support the example plate elements 102.

Figure 2A:
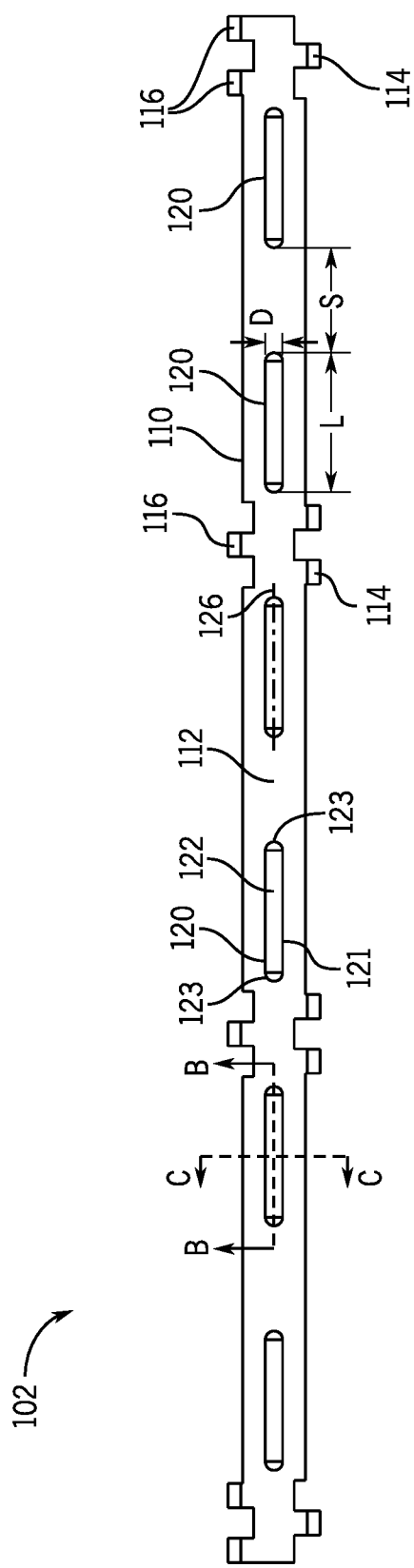
FIG. 2A is a top view of an example plate element for use in the wire conveyor belt assembly of FIG. 1.

With additional reference to FIGS. 2A, 2B, and 2C, an example of the plate element 102 is shown. In the example embodiment, the nominal overall dimensions of an assembled plate element 102 are about 12 inches laterally (i.e., transverse to the direction of travel 108), about 0.5 inches in the direction of travel 108, and about 0.025 inches in thickness T of the plate body 110 (shown in FIG. 2C). Of course, the plate elements 102 can be adapted and scaled to accommodate a variety of application-specific requirements and settings. The plate element 102 includes a plate body 110 having a planar base surface 112. In the illustrated embodiment, the plate element 102 further includes a plurality of leading engagement elements 116 and trailing engagement elements 114. Each of the leading and trailing engagement elements 116, 114 are configured to engage leading and trailing rods 104, respectively, thereby securing the plate element 102 to the interlocked rods 104 of the wire conveyor belt assembly 100. It should be appreciated that the terms "leading" and "trailing" are used for the purpose of relative orientation and that each of the leading and trailing engagement elements 116, 114 of the present embodiment may be substantially similar, with the example wire conveyor belt assembly 100 capable of adaptation for use in a variety of installations. In the example shown, the leading and trailing engagement elements 116, 114 are formed from tabs 118 integrally formed with the plate body 110, as will be described in detail below with reference to FIG. 3.

FIGS. 2A, 2B, and 2C further illustrate a plurality of interface elements 120 spaced across the planar base surface 112 and formed in the plate body 110. Each of the interface elements 120 includes an interface surface 122 and a perimeter 121 that terminates at the planar base surface 112. In the example embodiment, each interface surface 122 is entirely surrounded by the planar base surface 112 of the plate body 110, such that each interface element 120 is discrete from an adjacent interface element 120. In use, the interface element 120 can be configured to engage and/or support at least a portion of a product on the interface surface 122 that extends away from the planar base surface 112, thereby at least partially supporting the product apart from the planar base surface 112. In particular, FIG. 2B shows the interface surface 122 formed to establish a height H from the planar base surface 112, such that the interface surface 122 is raised above or offset from the planar base surface 112. In one form, the interface surface is generally arcuate and establishes a height H of approximately 0.015 inches. The form factor and dimensions of the interface element 120 may take a variety of forms, and in one example, the height H can be about equal to the thickness of the thickness T of the plate body 110. In some forms, the height H is less than the thickness T, such as about 10-25% less.

In the example shown, each of the interface elements 120 is generally elliptically shaped (as viewed normal to the planar base surface 112) and includes a major axis 126 extending through each focal point of the ellipse (i.e., the center of each half circle as viewed normal to the planar base surface 112). The lateral distance L (i.e., transverse to the direction of travel 108) of each example interface element 120 is about 1-1.5 inches, the travel distance D in the direction of travel 108 of each interface element is about 0.125-0.1875 inches, and the example radius of the half circles can be about half of the travel distance D (e.g., about 0.0625 inches). In some forms, the ratio of the lateral distance L to the travel distance D can be about 8:1, and in other embodiments about 10:1. Similarly, in some forms, the ratio of the travel distance D to the height H can be about 8:1, and in other embodiments about 10:1. In the example embodiment, the separation distance S between adjacent interface elements is about 1-1.5 inches. In some forms, the separation distance S is generally similar (e.g., within 10-15%) of the lateral distance L defined by the interface element 120.

While the example shown depicts the interface elements 120 as generally elliptical, other configurations are possible. For example, interface elements may be formed in any number of shapes or contours, such as circular, hemispherical, etc., such that they define an interface surface configured to at least partially engage a product. The example interface element 120 can define a generally arcuate interface surface 122. FIGS. 2B and 2C further illustrate a generally concave surface 130 formed in the plate body 110 (when viewed from underneath the plate body 110) during the manufacturing step of forming the interface elements 120. Further, the interface element 120 can define arcuate ends 123 having a contoured profile 124 that transitions from the plate body 110. As shown in FIG. 2C, the interface element 120 can define, in one embodiment, the concave surface 130 having a radius of about 0.16 inches to establish the example height H.

In still other forms, the interface element 120 need not be generally symmetrical (e.g., across a major axis 126), but can take a non-symmetric form factor. In some forms, the interface elements 120 are configured with arcuate and curved surfaces to inhibit undesirable interactions with the product during conveying, such as product marking and snagging when being conveyed by the conveyor belt along a heating element (e.g., a heating plate). Furthermore, the contour and raised or offset profile of the interface elements 120 relative to the generally planar base surface 112 can establish cooperating form factors that establish the desired restraint and compression of a product between the conveyor belt and a heating element, and thus minimize the undesirable issues encountered in traditional arrangements.

In the example shown, the major axes 126 of each of the interface elements 120 are oriented in a line on a single plate element 102 and may be considered generally parallel when assembled adjacent to another plate element 102. As shown, a single row of six interface elements 120 are depicted; however, it should be appreciated that other configurations are possible (see, e.g., FIGS. 10-14). Similarly, additional embodiments may include interface elements having a different spacing than the example shown in FIG. 2A, while maintaining interface surfaces configured to support a product above a planar base surface.

Figure 3:
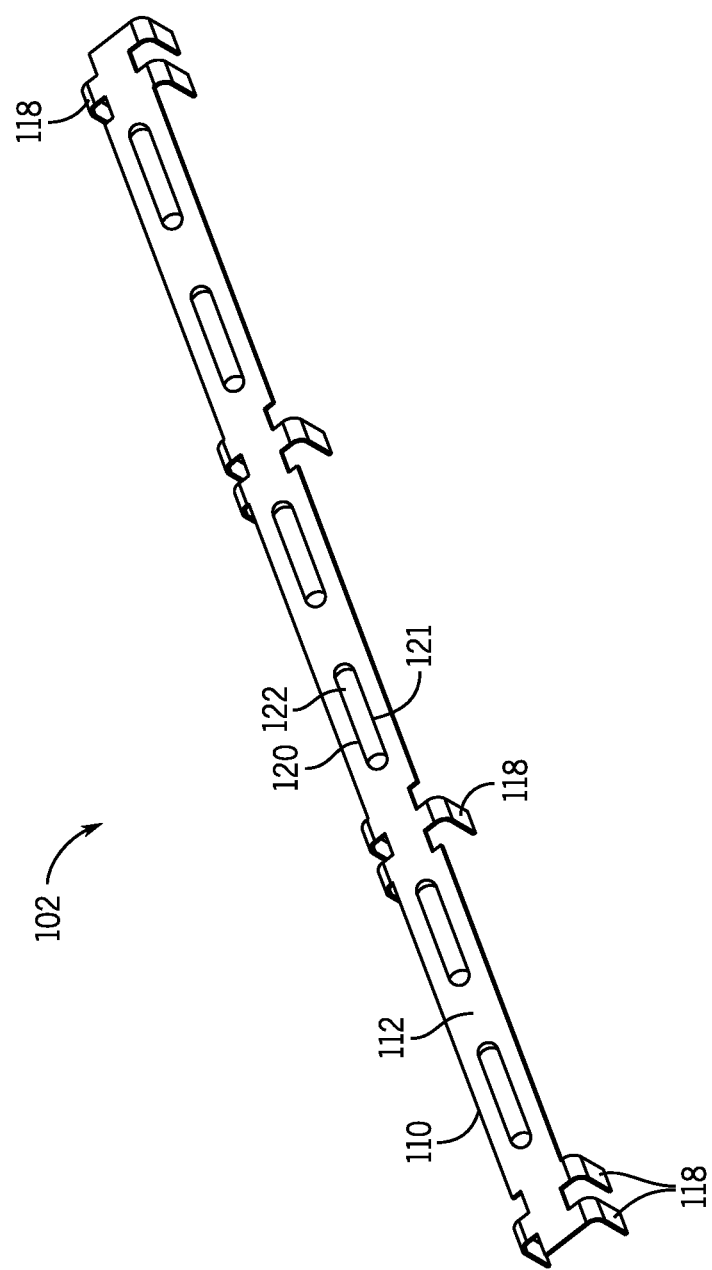
FIG. 3 is a top isometric view of the example plate element of FIG. 2A having tabs in a pre-formed orientation.
Figure 4:
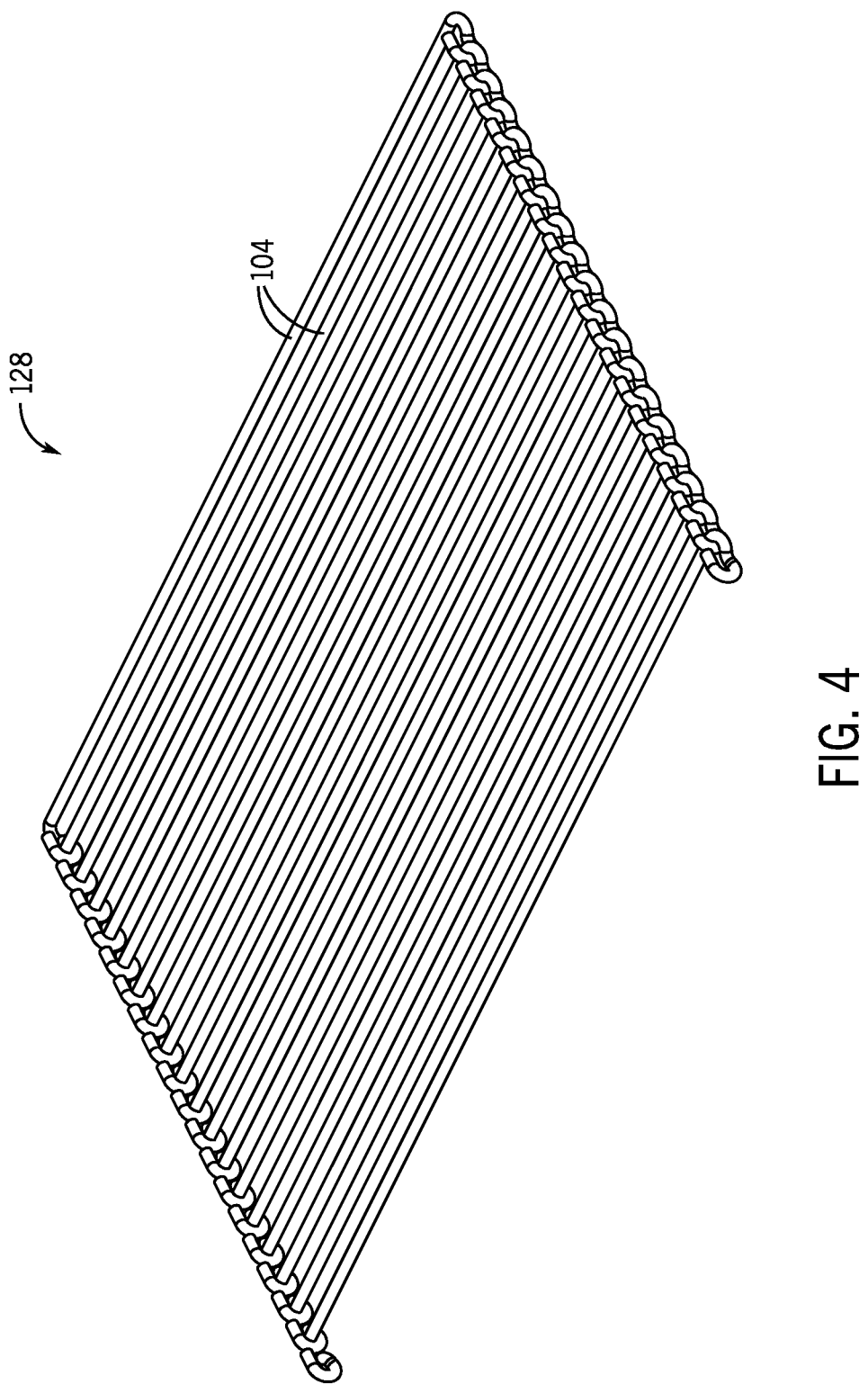
FIG. 4 is a top isometric view of a plurality of spaced rods of the wire conveyor belt assembly of FIG. 1.

Referring now to FIG. 3, the plate element 102, in an intermediate manufacturing stage, includes tabs 118. In one example, the plate element 102 can be formed (e.g., stamped from a generally planar sheet of metal, such as stainless steel and any other material suitable for the environment/application), thereby defining an outline of the plate body 110. The outline includes tabs 118 that, in the present embodiment, extend laterally outward from the plate body 110 and are configured to be formed into the orientation shown in FIG. 3. The tabs 118 are then configured to be formed into the leading and trailing engagement elements 116, 114 to couple and secure the plate element 102 to an example rod arrangement 128 shown, for instance, in FIG. 4. The example tabs 118 represent only one example embodiment of how an example plate element 102 can be engaged with an underlying rod chain, such as the interconnected rod arrangement 128. In other embodiments, the plate elements 102 may be engaged or coupled (e.g., directly or indirectly) to a single rod 104, such as that shown in U.S. Patent Application Pub. No. 2019/0077605, which is hereby incorporated by reference as if fully set forth herein. Given the present disclosure, one skilled in the art will appreciate the various options available to support the plate element 102 on a base chain, belt, and the like.

Figure 5:
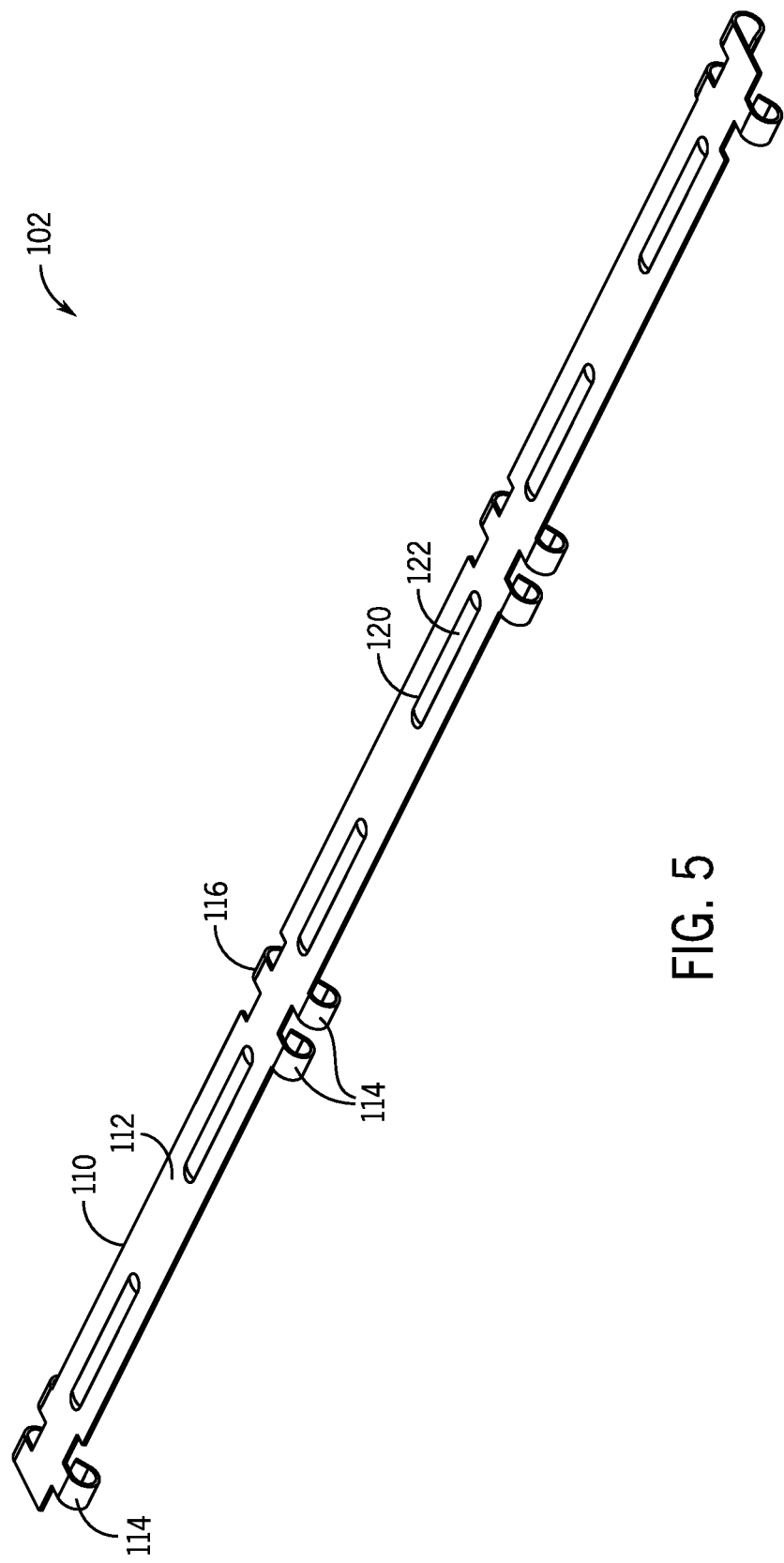
FIG. 5 is a top isometric view of the example plate element having tabs in a formed orientation.
Figure 6:
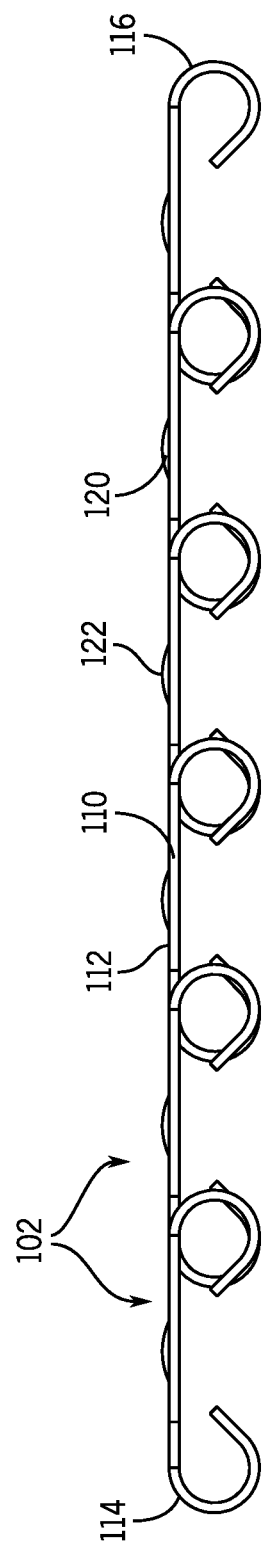
FIG. 6 is a side view of a plurality of plate elements having tabs in a formed orientation.

FIGS. 5 and 6 illustrate a final stage of the leading and trailing engagement elements 116, 114 formed in a secured orientation. In general, the example embodiment of the leading and trailing engagement elements 116, 114 are formed around the rod arrangement 128; however, FIGS. 5 and 6 provide views without the rod arrangement 128 for the purpose of illustrating the orientation of the leading and trailing engagement elements 116, 114. In the embodiment shown, each plate element 102 is depicted as having six leading engagement elements 116 and six trailing engagement elements 114; however, it should be appreciated that other configurations and arrangements are possible, and the leading and trailing engagement elements 116, 114 may be integral with and/or separately coupled to the plate body 110.

Figure 7:
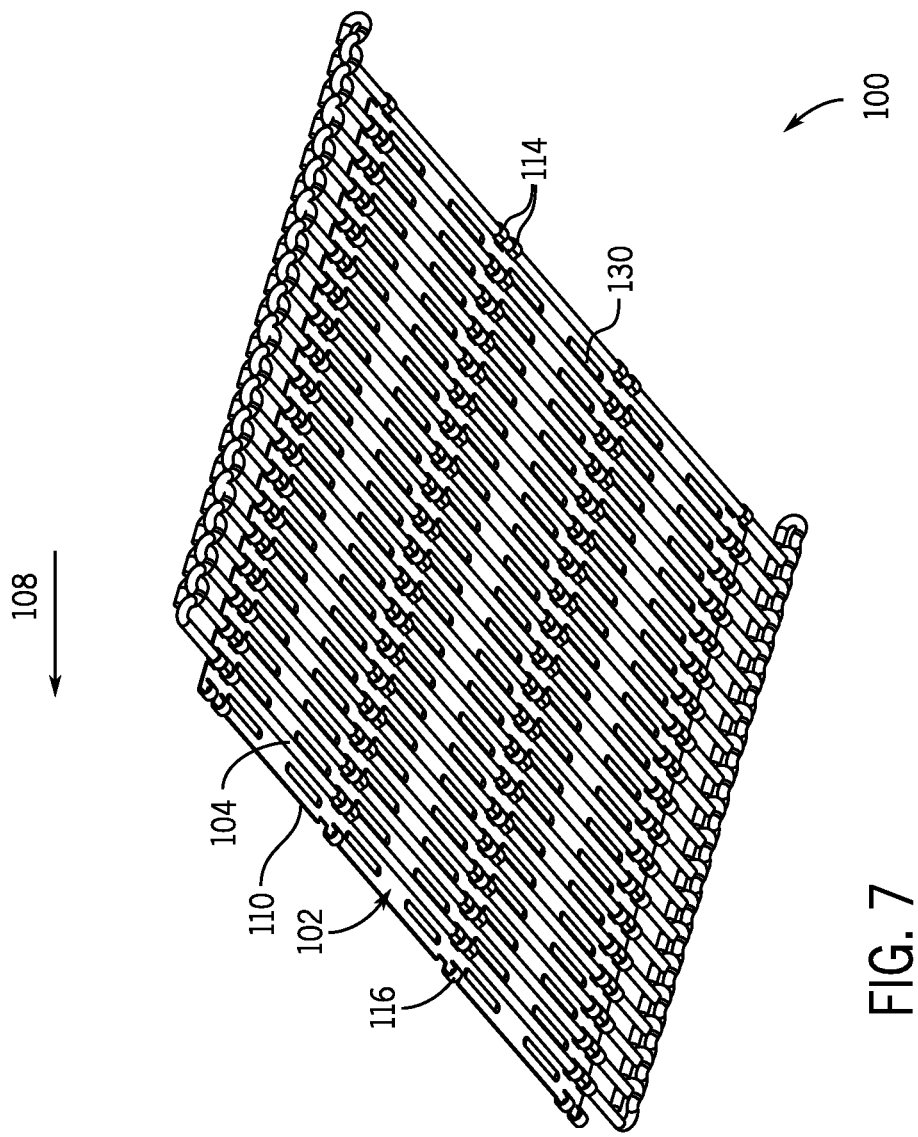
FIG. 7 is a bottom isometric view of the wire conveyor belt assembly of FIG. 1.

Referring now to FIG. 7, a bottom view of the wire conveyor belt assembly 100 is shown. Each of the leading and trailing engagement elements 116, 114 are secured to the rods 104 and are oriented along the plate body 110 thereby forming a substantially continuous surface across each planar base surface 112, which inhibits a product being conveyed on the wire conveyor belt assembly 100 from falling between adjacent plate elements 102. In other forms, the plate elements 102 can be modified to allow selected sections of product to accommodate airflow, provide drainage, etc. to thereby aid in heating, cooling, draining, or forming of product in a particular application environment.

Figure 8:
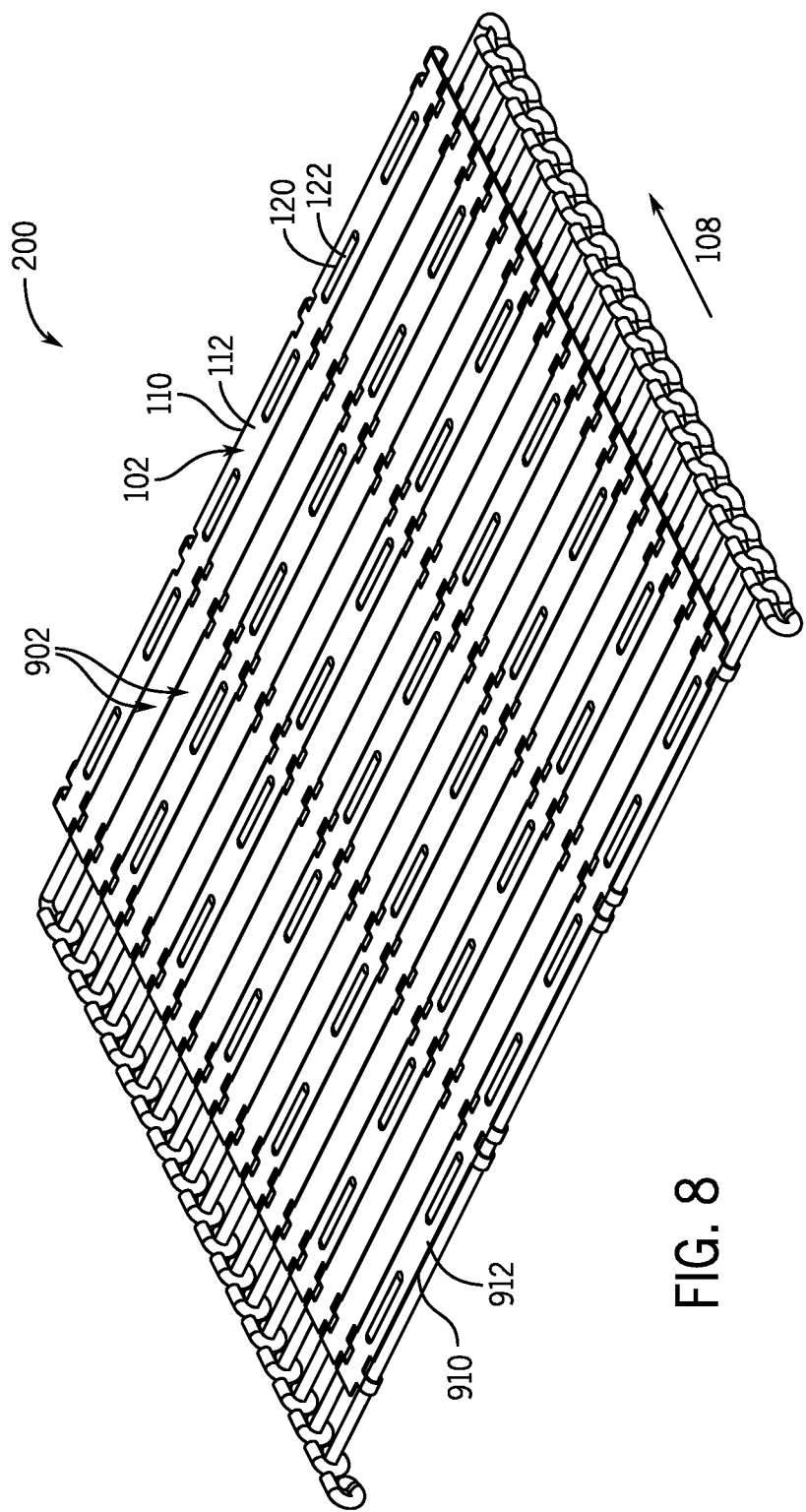
FIG. 8 is a top isometric view of a portion of an example wire conveyor belt assembly according to another embodiment of the invention.
Figure 9:
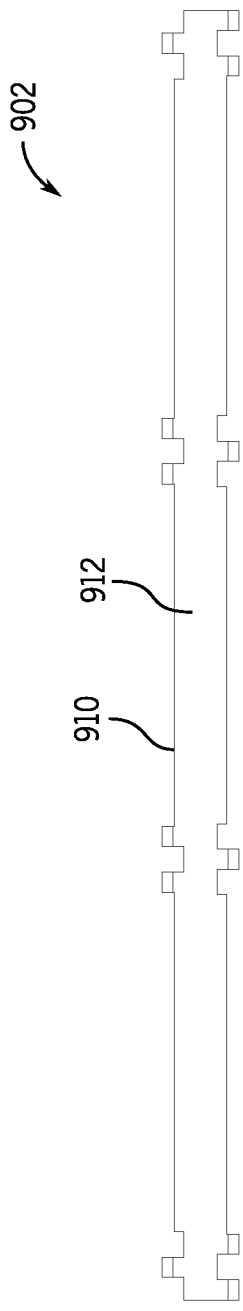
FIG. 9 is a top view of an example plate element according to another embodiment of the invention.
Figure 10:
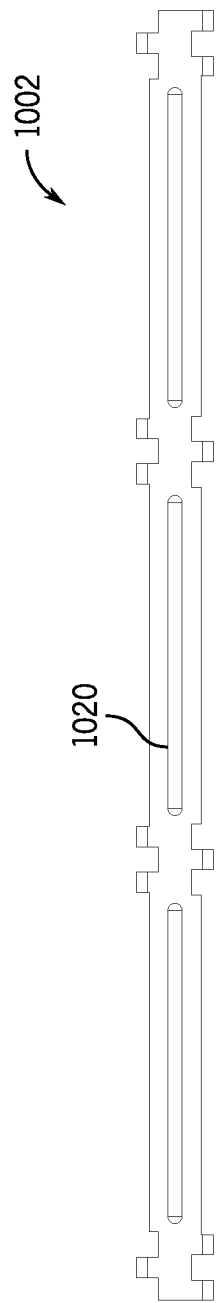
FIG. 10 is a top view of an example plate element according to another embodiment of the invention.

In another embodiment, a portion of an example wire conveyor belt assembly 200 is shown in FIG. 8. The wire conveyor belt assembly 200 includes plate elements 102 and generally smooth, non-contoured plate elements 902, shown in isolation from the wire conveyor belt assembly 200 in FIG. 9. Similar to the plate element 102, the smooth plate element 902 includes a plate body 910 having a planar base surface 912 that defines a substantially flat interface. In the example embodiment shown in FIG. 8, the wire conveyor belt assembly 200 includes a 1:2 ratio of plate elements 102 to smooth plate elements 902; however, it should be appreciated that other configurations are possible. For example, in another embodiment, the ratio of plate elements 102 to smooth plate elements 902 may be 1:1. In yet another example, there may not be a predefined ratio of plate element types. Further still, in some embodiments the smooth versus interface bearing plate elements may alternate laterally and/or in the direction of travel, both within a single plate element or by joining discrete plate elements laterally and/or in the direction of travel.

FIGS. 10-14 show additional example embodiments of plate elements 1002, 1102, 1202, 1302, and 1402 similar to plate element 102. In general, the structural features of each of the plate elements of FIGS. 10-14 remain consistent with the structural features of the plate element 102 (e.g., the planar base surface, the leading and trailing engagement elements, etc.) and therefore a detailed description of such will be omitted to avoid repetition. The additional embodiments can also be manufactured using techniques similar to those employed to manufacture the plate element 102. Some distinct features of each plate element of FIGS. 10-14, however, will be described below.

In practice, the pattern, placement, form factor, and orientation of interface elements can be adapted to suit and match particular application requirements. In one example, a denser arrangement of interface elements (e.g., interface elements 120 being relatively larger and/or covering a greater portion of the overall body 110) may be incorporated when the product being conveyed is lesser in size/form factor. Conversely, a less dense arrangement of interface elements may be included when the product being conveyed is greater in dimensions.

Figure 11:
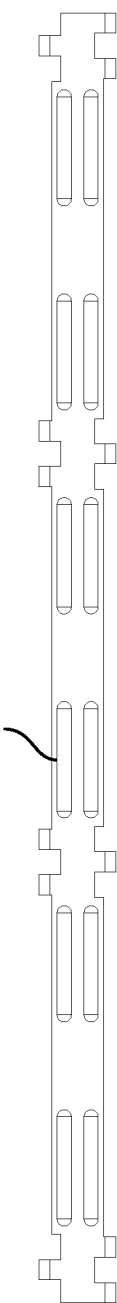
FIG. 11 is a top view of an example plate element according to another embodiment of the invention.
Figure 12:
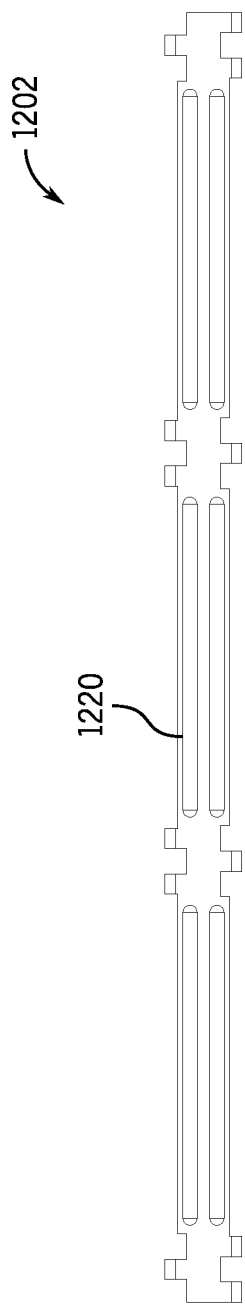
FIG. 12 is a top view of an example plate element according to another embodiment of the invention.
Figure 13:
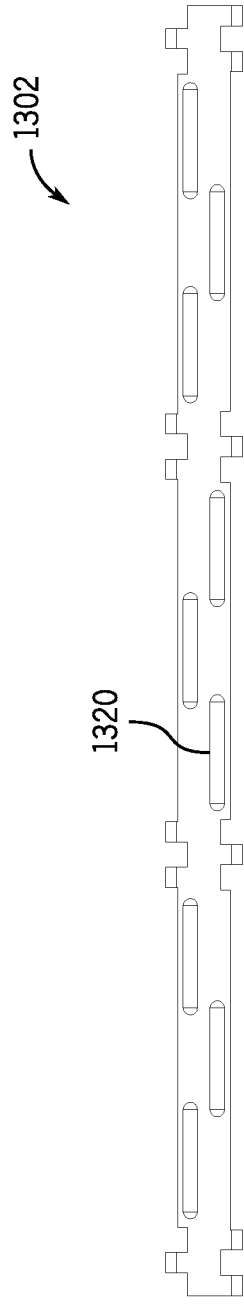
FIG. 13 is a top view of an example plate element according to another embodiment of the invention.
Figure 14:
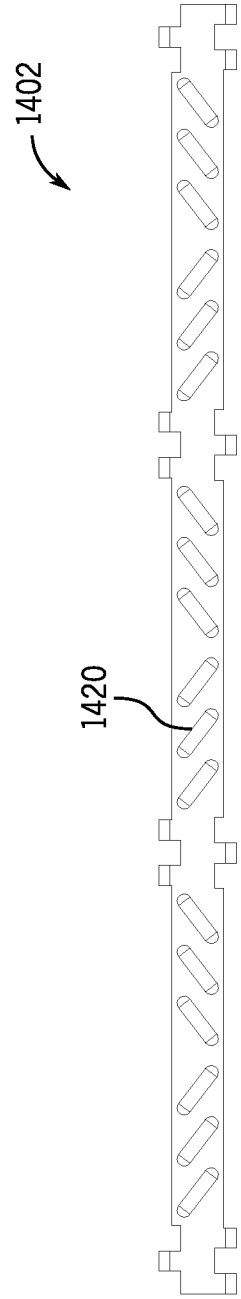
FIG. 14 is a top view of an example plate element according to another embodiment of the invention.

The orientation, placement, and form factor of interface elements shown in FIGS. 10-14 vary from the interface elements 120 shown, for instance, FIG. 1. For example, plate element 1002 includes a plurality of laterally extending interface elements 1020 centered between the leading and trailing engagement elements. FIG. 11 shows an additional example embodiment of the plate element 1102 that includes a plurality of substantially parallel and laterally extending interface elements 1120 spaced across the planar base surface in six paired groups. FIG. 12 shows an additional example embodiment of the plate element 1202 that includes a plurality of laterally extending interface elements 1220 in two rows substantially parallel to one another. FIG. 13 shows an additional example embodiment of the plate element 1302 that includes a plurality of interface elements 1320 in a staggered configuration spaced across the planar base surface. FIG. 14 shows an additional example embodiment of the plate element 1402 that includes a plurality of interface elements 1420 having a skewed orientation relative to the direction of travel such that at least some of the plurality of interface elements 1420 are parallel to one another. It should be appreciated that the above description regarding general orientation, placement, size, and form factor of interface elements of FIGS. 10-14 may be considered in the context of the interface elements having major axes similar to the major axis 126 of the plate element 102.

Given the benefit of this disclosure, one of ordinary skill in the art will appreciate that additional embodiments of the present invention may include alternate patterns of interface elements on plate elements not depicted in any of FIGS. 8-14. It should also be appreciated that any of the plate elements depicted in FIGS. 9-14 may be included in any of the wire conveyor belt assemblies 100 and 200. Furthermore, any of the example plate elements can be adapted for use in a vertical or horizontal toaster employing one or more belts, such as a spaced, parallel arrangement of vertical belts configured to sandwich, support, and/or engage a product to progress a product through the toaster.

It will be appreciated by those skilled in the art that while the invention has been described above in connection with particular embodiments and examples, the invention is not necessarily so limited, and that numerous other embodiments, examples, uses, modifications, and departures from the embodiments, examples, and uses are intended to be encompassed by the claims attached hereto. For example, the spacing, size, orientation, shape and other features may vary based on application-specific requirements (e.g., product to be conveyed, environmental factors, speed of conveyance, etc.). In addition, while the embodiments have been described in context of a metallic construction, it is contemplated that other materials (e.g., polymers) or composite constructions (e.g., a metallic base with a plastic overmold) are possible for both the plate elements 102 and the rods 104. Furthermore, other types of conveyor belts may also benefit from the incorporation of aspects of the invention. The entire disclosure of each patent and publication cited herein is incorporated by reference, as if each such patent or publication were individually incorporated by reference herein.

Various features and advantages of the invention are set forth in the following claims.

The invention claimed is:

1. A plate element for use in a wire conveyor belt assembly having a plurality of spaced rods, the plate element comprising:
   a plate body having a thickness and a planar base surface;
   a leading engagement element that extends from the plate body and is configured to engage a leading rod of the plurality of spaced rods;
   a trailing engagement element that extends from the plate body and is configured to engage a trailing rod of the plurality of spaced rods; and
   at least one interface element that extends away from the planar base surface a height to form a raised interface surface having a travel distance, wherein the height is about equal to the thickness and a ratio of the travel distance to the height is at least about 8:1.

2. The plate element of claim 1, wherein the interface element defines a perimeter that terminates at the planar base surface.

3. The plate element of claim 2, wherein the perimeter defines an elliptical shape.

4. The plate element of claim 3, wherein a major axis of the elliptical shape is skewed relative to a direction of travel of the plate element.

5. The plate element of claim 1, wherein the at least one interface element includes a plurality of interface elements.

6. The plate element of claim 5, wherein a first interface element of the plurality of interface elements is oriented substantially parallel with a second interface element of the plurality of interface elements.

7. The plate element of claim 1, wherein the plate body is at least one of metal, plastic, or a composite material.

8. The plate element of claim 1, wherein each of the leading engagement element and the trailing engagement element include a plurality of tabs configured to be formed around the leading rod and the trailing rod, respectively.

9. The plate element of claim 1, wherein the interface element is integrally formed from the planar base surface.

10. A conveyor belt assembly comprising:
a plurality of spaced rods disposed transversely with respect to a direction of travel of the conveyor belt; and
a plurality of plate elements configured to engage at least some of the plurality of spaced rods, each of the plurality of plate elements having a planar base surface;
wherein at least one of the plate elements includes an interface element defining an interface surface extending from the planar base surface and a concave surface opposite to the interface surface.

11. The conveyor belt assembly of claim 10, wherein the interface element has an elliptical perimeter.

12. The conveyor belt assembly of claim 10, wherein the at least one plate element includes a plurality of interface elements spaced apart across the planar base surface.

13. The conveyor belt assembly of claim 12, wherein at least one of the plurality of interface elements is oriented substantially parallel with another of the plurality of interface elements.

14. The conveyor belt assembly of claim 10, wherein the plurality of plate elements further include a leading engagement element that extends laterally from the planar base surface and is configured to engage a leading rod of the plurality of spaced rods and a trailing engagement element that extends away from the planar base surface and configured to engage a trailing rod of the plurality of spaced rods.

15. The conveyor belt assembly of claim 10, wherein the plurality of plate elements are at least one of metal, plastic, or a composite material.

16. The conveyor belt assembly of claim 10, wherein at least one of the plate elements has a smooth product support surface.

17. A method of manufacturing a plate element for use in a conveyor assembly, the method comprising:
forming a planar sheet of material thereby defining an outline of the plate element;
forming a raised interface element on one side of the planar sheet defining an arcuate interface surface; and
forming an engagement element defining an arcuate portion and a linear terminal end that extends tangentially from the arcuate portion toward the planar sheet in an orientation skewed relative to the planar sheet.

18. The method of claim 17, wherein forming the planar sheet of material thereby defining the outline of the plate element further comprises stamping the outline to include a tab that extends laterally from the outline of the plate element.

19. The method of claim 18, wherein forming the engagement element comprises forming the tab to define the arcuate portion and the linear terminal end that extends tangentially from the arcuate portion toward the planar sheet in the orientation skewed relative to the planar sheet.

* * * * *

UNITED STATES PATENT AND TRADEMARK OFFICE
CERTIFICATE OF CORRECTION

PATENT NO. : 11,279,563 B2
APPLICATION NO. : 16/717785
DATED : March 22, 2022
INVENTOR(S) : Sajid A. Safvi et al.

It is certified that error appears in the above-identified patent and that said Letters Patent is hereby corrected as shown below:

In the Specification

Column 5, Line 20, "Din" should be --D in--.

Signed and Sealed this
Thirty-first Day of May, 2022

Katherine Kelly Vidal
*Director of the United States Patent and Trademark Office*